United States Patent [19]
Wolfe

[11] 3,770,038
[45] Nov. 6, 1973

[54] RELUGGING LARGE PNEUMATIC TIRES
[75] Inventor: Merritt W. Wolfe, Akron, Ohio
[73] Assignee: The Goodyear Tire & Rubber Company, Akron, Ohio
[22] Filed: June 28, 1972
[21] Appl. No.: 266,856

Related U.S. Application Data
[62] Division of Ser. No. 885,254, Dec. 15, 1969, Pat. No. 3,703,433.

[52] U.S. Cl. .............................................. 152/209
[51] Int. Cl. ............................................ B60c 11/04
[58] Field of Search .................................. 152/209

[56] References Cited
UNITED STATES PATENTS
2,474,013   6/1949   Rawls................................ 152/209
3,196,920   7/1965   Fishman............................ 152/209

Primary Examiner—James B. Marbert
Attorney—F. W. Brunner et al.

[57] ABSTRACT

A method of relugging large off-the-road pneumatic tires in which an interlocking relationship is provided among the lugs resulting in a continuous circumferential rib and a tread pattern having improved resistance to driving, breaking and turning torques.

8 Claims, 6 Drawing Figures

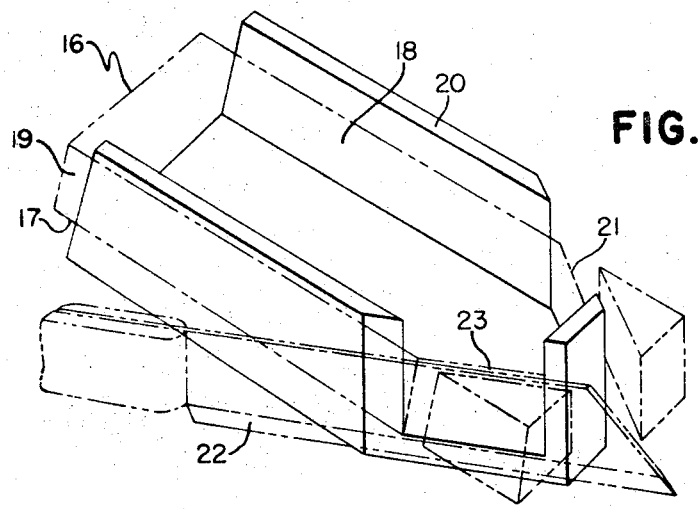
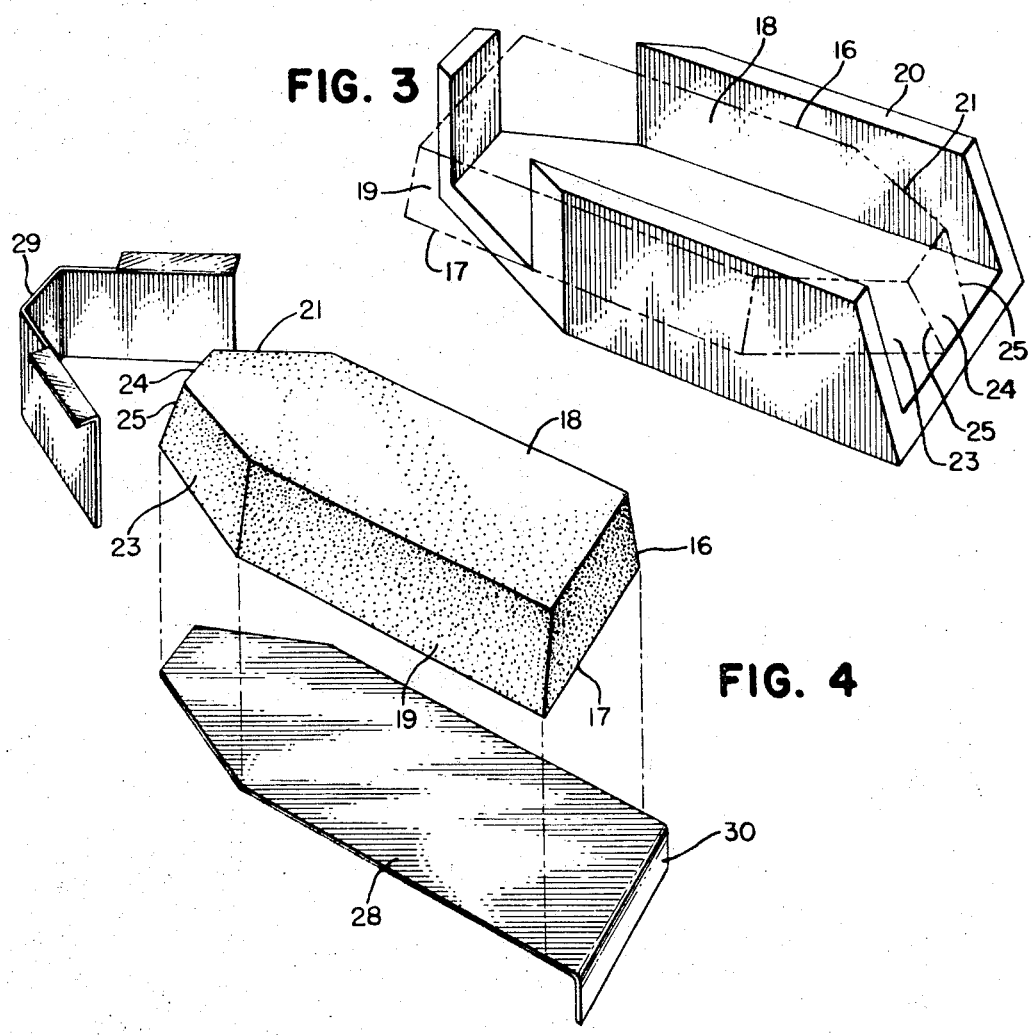

RELUGGING LARGE PNEUMATIC TIRES

This is a Division of application Ser. No. 885,254 filed Dec. 15, 1969 now U.S. Pat. No. 3,703,423.

The foregoing abstract is not to be taken as limiting the invention of this application, and in order to understand the full nature and extent of the technical disclosure of this application, reference must be made to the accompanying drawings and the following detailed description.

This invention relates to pneumatic tires, and in particular to a method for relugging large off-the-road tires.

The tread portion of large off-the-road tires is sometimes subjected to serve wear and abrasion conditions in normal operation which causes the tread to wear out long before the carcass or any other structural member of the tire is worn out. Under these circumstances the tire can be returned to a retreading shop where the tread portion or anti-skid portion can be replaced. One method of replacing the anti-skid portion is to first buff the tread area of the carcass smooth and repair any cuts or holes in the carcass. A relatively thin band of rubber is then placed around the periphery of the tire in the tread area and subsequently individual lugs representing the antiskid portion are adhered to the band. The tire is then placed is an open steam heater to cure the band and lugs. While this method is adequate under most circumstances difficulties have arisen when such retreaded tires are subjected to severe torque and abrasion conditions. The torque applied to the tire lugs when driving, breaking or turning will sometimes tear the lug loose from the band. Also, severe cutting and abrasion can cause the tread portion to wear away excessively fast.

It is an object, therefore, of this invention to provide a novel and improved method of accurately positioning new lugs on tires that will result in lugs having good resistance to breaking, driving and turning torques which tend to loosen the lugs from the tire. It is another object of this invention to provide a method of providing increased tread surface in a relugged tire. It is a further object of this invention to provide a relugged pneumatic tire having lugs with improved resistance to breaking, turning and driving torques and resistance to tread wear.

In the drawings:

FIG. 2 is a perspective view of a tire lug being trimmed in a miter box in accordance with the method of this invention;

FIg. 3 is a perspective view of the lug of FIG. 2 being further trimmed in the miter box of FIG. 2 in accordance with the method of this invention;

FIG. 4 is an exploded perspective view of the lug of FIg. 2, a lug nose guard and a lug support plate used in accordance with the method of this invention.

Figure 1:
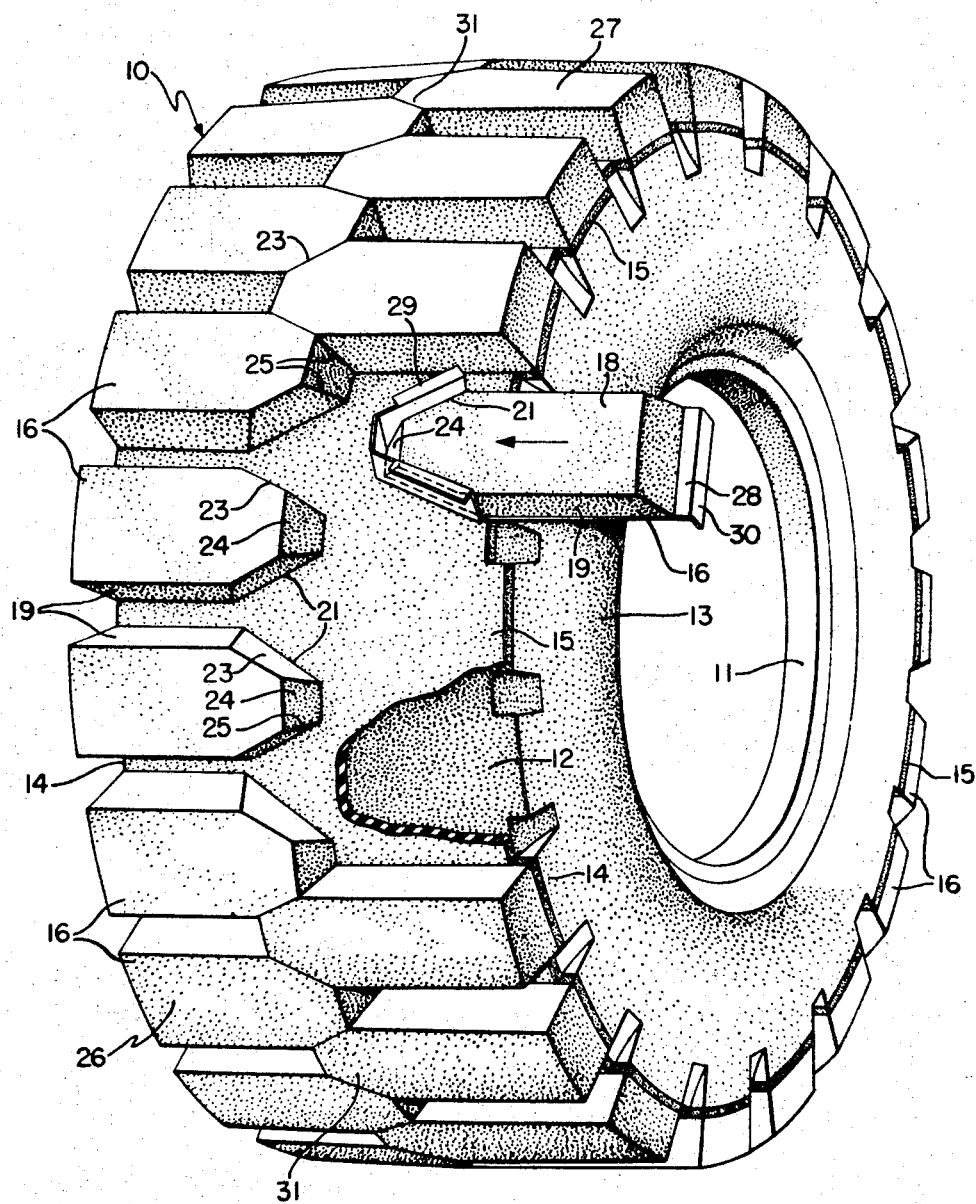
FIG. 1 is a perspective view of a pneumatic tire with portions broken away which has been partially relugged in accordance with the method of this invention.

With reference to the drawings and in particular FIG. 1 there is illustrated a large off-the-road type tire 10. Such a tire has a pair of spaced apart beads 11 and a tread area 12 extending circumferentially about the tire 10 and between a pair of shoulders 14. A pair of sidewalls 13 extend from the beads 11 to the tread 12.

With reference to FIG. 1, in a known method of retreading or relugging tires the entire tread area 12 is buffed clean and smooth from shoulder to shoulder. The tire through is then inspected carefully for cuts and bruises. Any such cuts and bruises are cleaned and buffed and repaired in a manner well known in the art. A thin band of uncured rubber stock 15 which is equal in width to the width of the tread area from shoulder to shoulder and long enough to extend circumferentially about the tread area 12 is prepared. A sufficient number of lugs 16 to provide a complete tread pattern are extruded and cut to length. The lugs are generally straight and have a length longer than their width. As best seen in FIGS. 1 THROUGH 4 each lug, in sections taken perpendicular to its long dimension, has the appearance of a truncated isosceles triangle. For purposes of this invention and the description of the lugs, the side of the lug corresponding to the base of the truncated isosceles triangle will be referred to as the base 17 of the lug. The side of the lug corresponding to the top of the truncated isosceles triangle will be referred to as the top 18 of the lug. The surfaces of the lug corresponding to the sides of the truncated isosceles triangle will be referred to as the sides 19 of the lug.

According to the method of this invention and as illustrated in FIG. 2, each lug is then placed in a miter box 20 and the sides 19 of one end 21 are beveled toward said one end 21 by cutting with a knife 22 and using the miter box 20 as a guide. Each lug is beveled the same amount. In the specific embodiment illustrated the surface 23 of the beveled portion is perpendicular to the planes of the top 18 and base 17 of the lug 16. The lug 16 is then turned end for end in the miter box, as illustrated in FIG. 3. The beveled end 21 is then further trimmed to form a nose 24 which is slanted inwardly of the lug 16 from the base 17 of the lug to the top 18 of the lug. The slanting of the nose 24 should be sufficient to provide corners 25 on the sides of the nose 24 each of which lies in a plane parallel to its respectively opposite side 19 of the lug 16.

The band 15 and the uncured rubber lugs 16 are prepared simultaneously and kept as close to the extrusion temperature as is practical during the retreading operation. The buffed tread area 12 of the tire 10 is coated with a suitable cement. As seen in FIG. 1, the band is then wrapped about the tread area 12 and stitched down in a manner well known in the art. A first series or plurality of lugs 26 are then applied to the band 15 in a first region which extends circumferentially about the tire. The lugs are accurately spaced apart about the circumference of the tire to form a uniform embodiment pattern. Each lug 16 of this first series of lugs 26 extends laterally of and from one shoulder 14 with its piece 21 or nose 24 extending partially across the mid-circumferential centerplane of the tire 10. The mid-circumferential centerplane is a plane which is perpendicular to the rotational axis of the tire 10 and lies mid-way between the lateral edges of the tread area 12. Each lug of a second series or plurality of lugs 27 is beveled provided with a shielding means to FIG. the lug from adhering to adjacent rubber parts of the tire 10 such moved into the band 15 or another lug 16 prior to the proper positioning of the lug adjacent lugs on the band 15. 21 joined As illustrated in FIG. 4, in the specific embodient illustrated, the shield means comprises a base plate 28 and a nose guard 29. The base plate 28 is a flat piec e of smooth metal cut to the size and shape of the base 17 of the lug 16 but having the end 30 opposite the nose 24 elongated and bent downwardly with respect to the lug 16. The nose guard 29 is a flat piece of metal bent to generally conform to the contour of the bevelled end 21. As seen in FIg. 1, a lug 16 of the second series of lugs 27 is then movedinto position with its beveled end 21 extending between the beveled ends of the two next adjacentugs in the first series 26 of rubber lugs. When the lug 16 is in position the nose guard 29 is removed and the confronting surfaces of the overlapped ends or beveled ends 1 are kpomed together to form an interlocking relationship or rib 31, or in other words the beveled surfaces 23 of the lug 16 in the second series of lugs 27 are adhered to the next adjacent respective beveled surface 23 of two lugs 16 in the first series of lugs 26. The base plate 28 on the bottom of the lug 16 is then removed by sliding it laterally outwardly with respect to the tire 10. The lug 16 is then stitched in position by any convenient means. Each successive lug 16 of this second series of lugs 27 is then placed in position in a second circumferential region adjacent to the first series of lugs 26 in a similar manner and stitched tight to the band 15. The accurate positioning of each lug 16 is important in order to form a good bond between the respective beveled surfaces 23. When all of the lugs 16 have been applied to the tread area 12, the tire 10 is placed in open steam at a sufficiently high temperature and for a sufficient period of time to cure the lugs 16 and the band 15. The tire is then removed from the curing unit and allowed to cool.

It should be noted that while in the specific embodiment illustrated the beveled surface 23 was perpendicular to the top surface 18 and the bottom surface 17 of the lug 16 it may be necessary in the case of tires having a relatively small diameter to taper the surface 23 inwardly of the lug 16 from the top 18 to the bottom 17 in order to get a good fit between the beveled surfaces 23 of mating lugs.

A best seen in FIG. 1 a relugged tire according to the invention has a continuous, substantially rigid circumferential rib 31 formed by the interlocking means or beveled ends 21 of the lugs 16 and the bond between the adjacent beveled surfaces 23. The lugs 16 in the first region 26 are connected to the lugs 16 in the second region 27 by vulcanizing the beveled surfaces 23 of each lug in the first region to the adjacent beveled surfaces 23 respectively of two next adjacent lugs in the second region. The beveled end of each lug in the first series of lugs 26 extends between two adjacent lugs in the second series of lugs 27 and overlaps the beveled ends of the adjacent lugs in the second series 27 laterally with respect to the tire. For purposes of this invention lugs that are said to be "laterally overlapping" shall be construed to mean lugs which pass through a common plane which is perpendicular to the rotational axis of the tire. The lugs being thus interlocked support each other and prevent individual lugs from being bent over and torn off or loosened by the torque applied to the tread when the tire is driving, breaking or turning. When a force tangent to the tread surface is applied to one or more of the lugs these lugs are prevented from bending or tearing off of the band 15 by the interlocking means or rib 31 which holds all the lugs together on the band.

Figure 5:
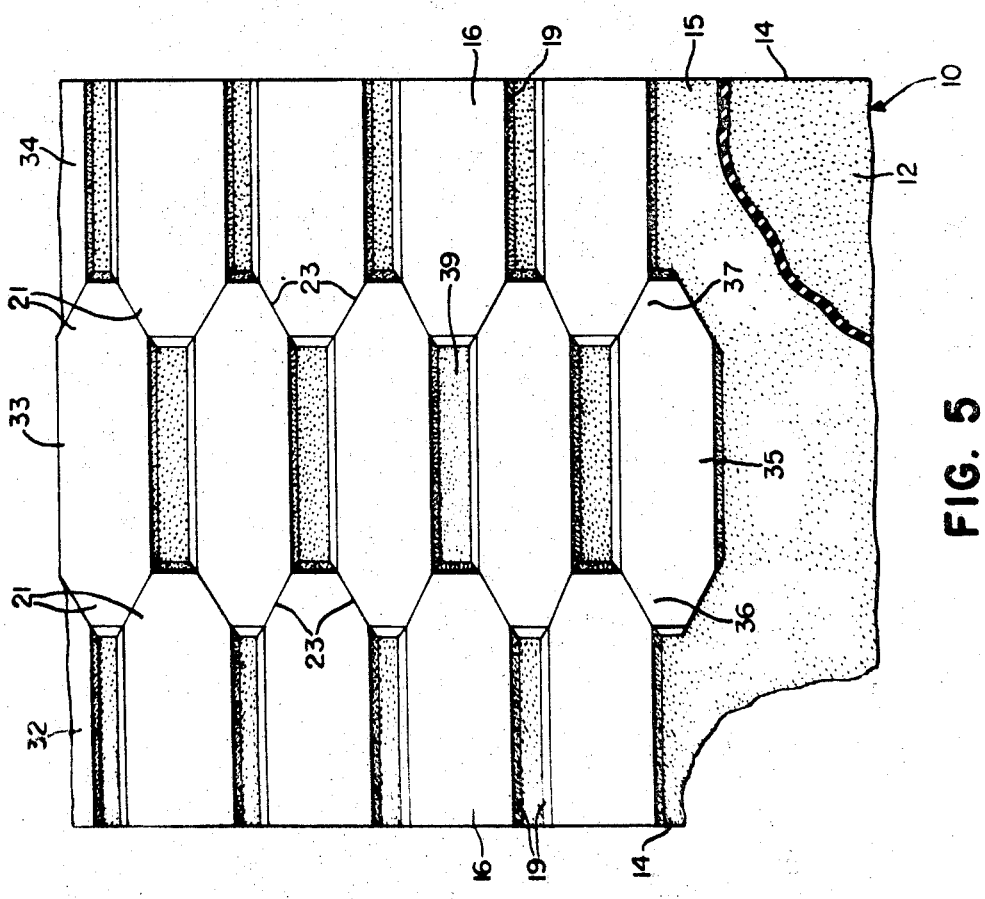

In an alternate embodiment of the invention illustrated in FIG. 5, a plurality of lugs 16 are prepared in the same manner as those illustrated in FIGS. 1 through 4. A second group of lugs 35 are prepared similar to the lugs 16 of FIGS. 1 through 4 but with both ends 21 beveled and trimmed as described above. The band 15 and lugs 16 and 35 are kept warm during the retreading operation as described above. The lugs 35 that were tapered on both ends are placed on the tire band 15 in the central portion or second circumferential region 33 of the tread extending circumferentially of the tire 10 with the individual lugs extending parallel to the rotational axis of the tire. The lugs 16 that were tapered on one end only are then placed on the tire band 15 on laterally opposite sides of the central lugs 35 in first and third circumferential regions 32 and 34, respectively, utilizing support plates 28 and nose guards 29 similar to those illustrated in FIG. 4. The single beveled end 21 of each lug 16 is inserted between the beveled ends 21 of a pair of next adjacent central lugs 35. The respective beveled surfaces 23 are adhered together and the lug 16 stitched to the band 15 in a manner similar to that described above and illustrated in FIG. 1. By this method two circumferential ribs 36 and 37 are provided by interlocking the lugs 16 and 35. The central series of lugs 35 are supported on both ends by the ribs 36 and 37 which results in lugs which have very good resistance to driving, breaking or turning torques.

It should be noted that to mold a deep lug tire similar to that illustrated in FIG. 5 would be very impractical since it would result in what is referred to as a "die-locked" tire. This means that in order to remove the tire 10 from the mold the mold must be radially disassembled. This is true since in order to remove the tire 10 from a mold the portion of the mold forming the slots 39 between the lugs 35 must be moved radially of the tire. The mold therefore must be made in a number of parts so that the individual sections forming the slots 39 can all move radially of the tire. This invention provides a tire having a series of deep cross lugs supported on both ends by a circumferential rib and a method of providing such lugs on a tire without the necessity of special expensive molds.

Figure 6:
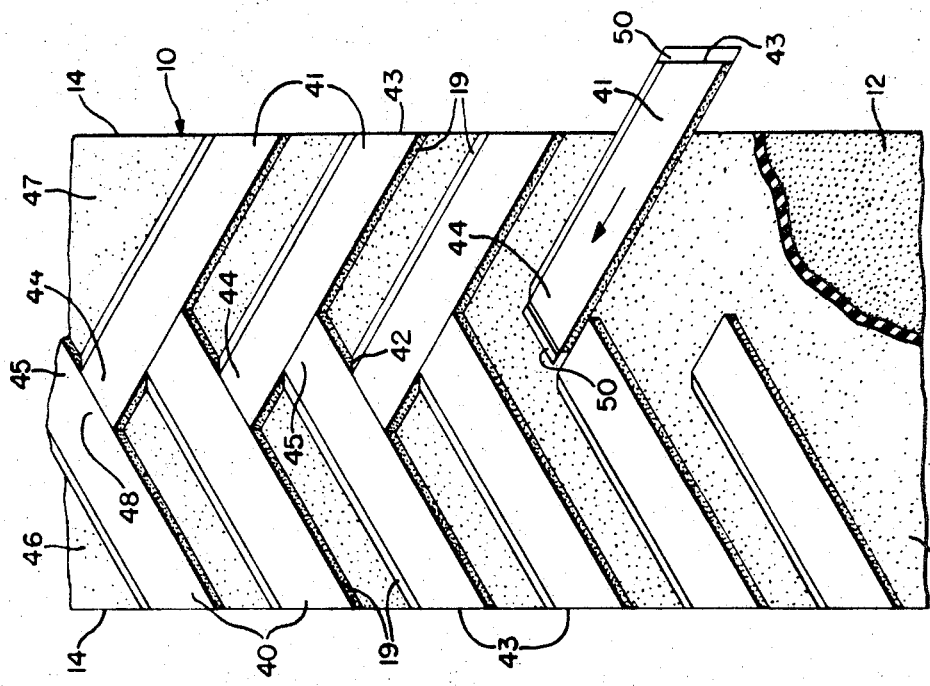
FIGS. 5 and 6 are schematic views of tread patterns illustrating alternate embodiments of the method of this invention.

In a further embodiment of the invention illustrated in FIG. 6, each elongated lug 40 and 41 has a cross-sectional configuration in the shape of a truncated isosceles triangle. In this embodiment, however, the lugs 40 and 41 are placed on the band 15 in a general chevron configuration; that is to say, the lugs 40 and 41, respectively, extend from opposite sdes of the tread 12 and angularly with respect to the rotational axis of the tire to meet at an apex 42 in the area of the mid-circumferential centerplane. This configuration, however, differs from a pure chevron configuration in that alternate lugs 40 and 41 extend beyond the normal peak or apex 42 of the usual chevron configuration a sufficient amount to engage the side 19 of the adjacent lug 41 or 40, respectively, extending from the opposite side of the tire. The outer end 43 of each lug 40, 41 is cut perpendicularly to the base 17 of the lug and at an angle with respect to the length of the lug such that the outer end 43 will be parallel to the tire sidewall 13 when the lug is placed on the band 15 at the desired angle with respect to the rotational axis of the tire. The inner ends 45 and 44 of each lug 40 and 41, respectively, are cut at an angle and tapered inwardly of the lug from the top 18 to the bottom 17 such that each end 44 or 45 conforms to the slant side 19 of its respective lug 40 or 41 extending from the opposite side of the tread area 12. The lugs 40 are placed on the band 15 in a first region 46 which is located on one side of the tire and extends circumferentially of the tire. The lugs 41 are placed on the band 15 in a second region 47 extending circumferentially of tire 10 adjacent to said first region. A suitable shield means 50 is used to prevent adherence to the lug to adjacent rubber parts prior to its proper positioning on the band 15. When each lug 41 is positioned in generally chevron relationship with the lugs 40 the shield means 50 is removed. The inner end 44 of each lug 41 in the second region 47 is adhered to the side 19 of a lug 40 in the first region 46 and the side 19 of the same lug 41 in the second region 47 is adhered to the inner end 45 of a lug 40 in the first region 46 which is next adjacent the first mentioned lug 40 in the first region 46 and on the same side of said first mentioned lug 40 as the lug 41. The lug 41 is then tacked down to the band 15. Each successive lug 41 is placed on the band 15 in a similar manner until a complete chevron pattern is established about the circumference of the tire. This method also provides an interlocking relationship among the lugs and a continuous circumferential rib 48 about the tire. As before, the rib 48 tends to transfer bending forces from one rib to the next, thus distributing the bending force on one rib among the adjacent ribs. This circumferential rib 48 and interlocking of the lugs resists torque which would tend to bend the lugs over and tear them loose from the band 15.

It will be obvious to one skilled in the art that more than two rows of lugs in a general chevron relationship could be used. Again in a configuration having three or more rows of lugs the advantage of lugs supported on both ends by a rib is gained without the attending problem of a "die-locked" tire. Also, the amount that the lugs in FIGS. 1 and 5 overlap is a design characteristic and the retreader could provide almost wedge shaped lugs and a very deep overlap forming a very wide circumferential rib 31, 36 or 37. Further, it should be noted that more than three rows of lugs similar to those illustrated in FIG. 5 could be provided depending on the size of the lugs and the tire. Moreover, it is not intended that this invention be limited to completely retreading a tire but should also include replacing portions of the anti-skid or tread of a tire.

While certain representative embodiments and details have been shown for the purpose of illustrating the invention, it will be apparent to those skilled in this art that various changes and modifications may be made therein without departing from the spirit and scope of the invention.

What is claimed is:

1. A relugged pneumatic tire in which the lugs thereon were formed prior to installation on the tire and in which the lugs comprise a first series thereof circumferentially spaced apart and disposed in a first circumferential region of said tire and a second series thereof disposed in a second circumferential region of said tire adjacent to said first circumferential region, said tire being characterized by all of the ends of the lugs of said first series of lugs laterally overlapping all of the ends of the lugs of said second series of lugs and the confronting surfaces of the overlapped ends of said lugs being adhered together to form a continuous circumferential rib.

2. A tire as claimed in claim 1, wherein said lugs extend substantially parallel to the rotational axis of said tire.

3. A tire as claimed in claim 2, wherein one end of each lug of said second series of lugs extends between the ends of a pair of next adjacent lugs of said first series of lugs.

4. A tire as claimed in claim 1, further characterized by a third series of lugs disposed in a third circumferential region adjacent to said second circumferential region, the ends of said third series of lugs overlapping the ends of said second series of lugs laterally with respect to said tire, and the confronting surfaces of the overlapped ends being adhered together to form a continuous circumferential rib.

5. A tire as claimed in claim 4, wherein said lugs extend substantially parallel to the rotational axis of said tire.

6. A tire as claimed in claim 1, in which said lugs extend angularly with respect to the rotational axis of the tire.

7. A tire as claimed in claim 4, wherein said lugs extend angularly with respect to said rotational axis of the tire.

8. A tire as claimed in claim 3, wherein the side of the overlapped portion of the end of each lug is beveled toward said end and the beveled portion comprises said confronting surface.

* * * * *

PO-1050
(5/69)

UNITED STATES PATENT OFFICE
CERTIFICATE OF CORRECTION

Patent No. __3,770,038__  Dated __November 6, 1973__

Inventor(s) __Merritt W Wolfe__

It is certified that error appears in the above-identified patent and that said Letters Patent are hereby corrected as shown below:

Column 1, line 14, "serve" should be -- severe --.

Column 1, line 26, "is" should be -- in --.

Column 2, lines 51 and 52 "embodiment" should be -- tread --.

Column 2, line 54, "piece" should be -- beveled end --.

Column 2, line 60, "beveled" should be -- then --.

Column 2, line 60, "FIG." should be -- prevent --.

Column 2, line 62, "moved into" should be -- as the --.

Column 2, line 63, "adjacent lugs" should be -- 16 --.

Column 2, line 64, omit "21 joined".

Column 2, line 65, "embodient" should be -- embodiment --.

Column 3, lines 5 and 6, "bevelled" should be -- beveled --.

Column 3, line 9, "adjacentugs" should be -- adjacent lugs --.

Column 3, line 12, "1" should be -- 21 --.

Column 3, line 12, "kpoomed" should be -- joined --.

Column 4, line 48, "sdes" should be -- sides --.

Signed and sealed this 21st day of May 1974.

(SEAL)
Attest:

EDWARD M. FLETCHER, JR.
Attesting Officer

C. MARSHALL DANN
Commissioner of Patents